(12) United States Patent
Yang

(10) Patent No.: US 6,370,283 B1
(45) Date of Patent: Apr. 9, 2002

(54) ELECTRO-OPTIC MODULATOR FOR GENERATING SOLITONS

(75) Inventor: Guangning Yang, Matawan, NJ (US)

(73) Assignee: TyCom (U.S.) Inc., Morristown, NJ (US)

( * ) Notice: Subject to any disclaimer, the term of this patent is extended or adjusted under 35 U.S.C. 154(b) by 0 days.

(21) Appl. No.: 09/182,604

(22) Filed: Oct. 29, 1998

(51) Int. Cl.[7] ............................................. G02B 26/00
(52) U.S. Cl. .............................. 385/2; 385/3; 359/237; 356/477; 356/450
(58) Field of Search ................. 385/2, 3, 9; 359/245, 359/237; 356/345; 349/141

(56) References Cited

U.S. PATENT DOCUMENTS 4,991,920 A * 2/1991 Peczalski ................. 350/96.14
5,414,443 A * 5/1995 Kanatani et al. ............... 345/95
5,973,816 A * 10/1999 Akiyama et al. ........... 359/237
6,201,589 B1 * 3/2001 Tombling et al. ........... 349/141

* cited by examiner

*Primary Examiner*—Frank G. Font
*Assistant Examiner*—Michael P Mooney

(57) ABSTRACT

A method and apparatus is provided for generating optical pulses with an electro-optic amplitude modulator. The modulator includes first and second waveguides that form an optical interferometer. At least the first waveguide includes an electro-optic material such as lithium niobate and an electrode extending along a portion thereof. Input and output optical waveguides are respectively coupled to input and output junctions of the interferometer. A voltage source biases the electrode such that a modulation switching curve arises that generates two optical pulses over a complete voltage cycle.

20 Claims, 2 Drawing Sheets

ELECTRO-OPTIC MODULATOR FOR GENERATING SOLITONS

TECHNICAL FIELD

This invention relates generally to amplitude modulators and more particularly to an electro-optic modulator for generating solitons from a continuous wave signal.

BACKGROUND OF THE INVENTION

Long distance optical transmission using optical amplifiers can provide greater bandwidth at lower cost than that using electronic regeneration. Erbium doped optical fiber amplifiers can easily handle several channels simultaneously, and do so with low crosstalk. For long distance transmission, it is necessary to use a transmission mode which is resistant to the various dispersive effects of the fiber. In au optical fiber transmission path, the optical fiber's chromatic dispersion, acting by itself, attempts to broaden pulse signals in time. The fiber's index, which also depends on the intensity of light, acting by itself through the process of self phase modulation, always serves to broaden the pulse's frequency spectrum. Thus, for long distance transmission, an optical signal which is resistant to the various dispersive effects of the optical fiber can result in an increase in the spacing between optical amplifiers in the optical transmission path.

Under certain conditions such as, for example, zero loss or loss periodically compensated by optical gain, a soliton is nondispersive in the time domain. Thus, the waveshape of a soliton is independent of the distance that it travels along an optical fiber. In addition, a soliton is also nondispersive in the frequency domain. Thus, for a range of soliton pulse widths, such as 50–80 ps for a data rate of 2.5 G b/s, and fiber group delay dispersion parameters of approximately 0.7–2 ps/nm/km, the distance that a soliton can be transmitted before serious dispersive effects occur is typically 500 km or greater.

Creation of soliton pulses is dependent upon proper launch and transmission characteristics such as pulse power, pulse width, center frequency, and fiber dispersion. Of particular concern for the present purposes, creation of solitons require the generation of temporally narrow pulses, typically on the order of 1–10 picoseconds. These characteristics of solitons are well known to those skilled in the art and will not be discussed further herein. For additional information concerning soliton generation and soliton transmission, see Optical Fiber Telecommunications II, ed. S. E. Miller et al., p.90 et seq. (Academic Press 1988).

One device for generating solitons consists of a high speed amplitude modulator such as an electro-optic waveguide modulator. One class of electro-optic modulators are made of ferroelectric materials, such as z-cut lithium niobate ($LiNbO_3$) or lithium tantalate ($LiTaO_3$). These modulators convert an applied voltage to an optical signal. Typically, an electric pulse is used to generate an optical pulse. Lithium niobate modulators are commonly employed because they offer high speed, a high extinction ratio, and a controllable (or zero) chirp. However, one problem with such modulators is that it is difficult to generate extremely narrow electrical pulses that can be translated into optical pulses of sufficiently narrow temporal width to form solitons.

Therefore, it is desirable to provide an electro-optic amplitude modulator with an electric signal that allows the modulator to generate temporally narrow optical pulses.

SUMMARY OF THE INVENTION

In accordance with the present invention, a method and apparatus is provided for generating optical pulses with an electro-optic amplitude modulator. The modulator includes first and second waveguides that form an optical interferometer. At least the first waveguide includes an electro-optic material such as lithium niobate and an electrode extending along a portion thereof. Input and output optical waveguides are respectively coupled to input and output junctions of the interferometer. A voltage source biases the electrode such that a modulation switching curve arises that generates two optical pulses over a complete voltage cycle.

In accordance with another aspect of the invention, a method is provided for generating optical pulses with an electro-optic amplitude modulator having a pair of waveguides and at least one pair of electrodes for controlling a refractive index of at least one of the waveguides. In particular, a cw optical signal is received at an input waveguide of the modulator. At least one electrical pulse is applied to the electrode pair to modulate the cw optical signal so that an edge of the electrical pulse yields an optical pulse at an output waveguide of the modulator. The optical pulse may have a temporal width substantially equal to the temporal width of the edge of the electrical pulse.

In contrast to known biasing arrangements in which an electrical pulse was required to produce an optical pulse, the present invention advantageously produces an optical pulse upon a change in voltage levels. Since it is relatively easy to produce sharp voltage transitions (as opposed to narrow electrical pulses), the invention is capable of produces extremely narrow optical pulses, such as solitons, for example.

DETAILED DESCRIPTION

Figure 1:
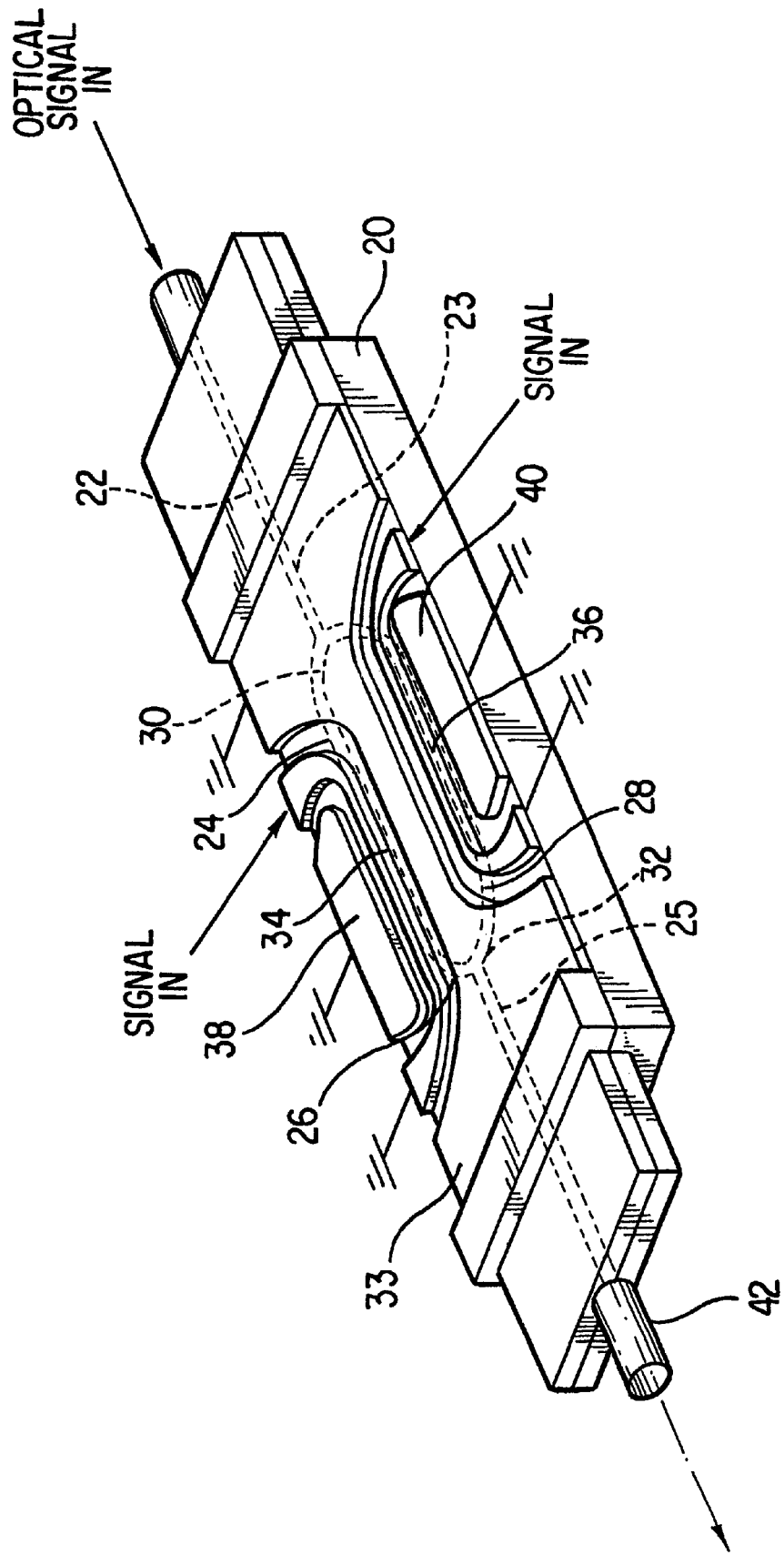
FIG. 1 shows a known lithium niobate amplitude modulator.

Referring to FIG. 1, there is illustrated an example of a known lithium niobate ($LiNbO_3$) high-speed amplitude modulator for modulating an optical signal with an electrical signal to form a soliton. It should be noted that the present invention is applicable to a wide variety of electro-optic amplitude modulators and that the modulator of FIG. 1 is shown for illustrative purposes only. As shown, an electro-optic material substrate 20 such as lithium niobate ($LiNbO_3$) or the like, which can convert an electrical potential into optical phase shifts, includes an optical waveguide 22. The waveguide 22 may be formed, for example, by diffusing titanium (Ti) into the substrate. Alternatively, the waveguide 22 may be formed in the substrate by a proton exchange process. The optical waveguide 22 is constructed to include two parallel paths 26 and 28 positioned between two optical Y junctions 30 and 32, which are respectively coupled to two end sections 23 and 25 of waveguide 22. The $LiNbO_3$ substrate, including the optical Y junctions, the parallel paths and the end sections, supports an $SiO_2$ buffer layer which forms a common ground plane and at least one pair of electrodes. The ground plane and the electrodes can be electroplated onto the buffer layer and may be formed from aluminum, silver, gold or the like. One pair of electrodes can comprise a ground plane 40 and an elongated electrode 36 positioned over optical waveguide 28. Electrode 36 can extend along the waveguide 28 for a distance of approximately 1 cm. Longer or shorter lengths can be chosen depending on the desired bandwidth. If another pair of electrodes is employed, it can comprise a ground plane 38 and an elongated electrode 34 positioned over optical waveguide 26. Electrode 34 can extend along the waveguide for a distance comparable to the length of electrode 36. A common ground plane 33 can be included to cooperate with electrodes 34 and 36. The assemblage of the $LiNbO_3$ substrate, the optical Y junctions and associated optical waveguides, and the set of electrodes is one manifestation of an interferometer normally identified as a Y junction Mach-Zehnder interferometer. The specific example of a double pair of electrodes to provide one set of electrodes is applicable to z-cut $LiNbO_3$, which is a commonly used crystal orientation. For x-cut $LiNbO_3$, a single pair of electrodes can be used in place of the double pair of electrodes.

In a Y junction interferometer, a change in the index of refraction of one or both waveguides 26 and 28, which is directly proportional to the voltages applied to the individual pairs of electrodes, causes an optical signal in the waveguides 26 and 28 to experience an optical phase shift. It is this optical phase shift which causes the optical signal to undergo an amplitude change. In operation, optical energy in the form of a continuous wave (cw) of optical energy from, for example, a laser via a single mode waveguide, is directed into end section 23 of waveguide 22, where it is divided into two equal optical signals by Y junction 30. At this instant, an electrical signal having a specific waveshape is applied to the pair of electrodes 36 and 40. If a second pair of electrodes is employed, an electrical signal having a phase which is 180 degrees out of phase with the first signal is applied to the second pair of electrodes 34 and 38. The electrical signal applied to the first pair of electrodes causes a change in the index of refraction of the waveguide 28. (If the second pair of electrodes is employed, the electrical signal applied to the second pair of electrodes causes a change in the index of refraction of the waveguides 26). The second Y junction 32 combines the two signals from the waveguides 26 and 28 into a single signal which causes an amplitude change to the optical signals in the waveguide 25. This signal advances along the end section 25 of waveguide 22 to an outgoing single mode fiber 42.

Figure 2:
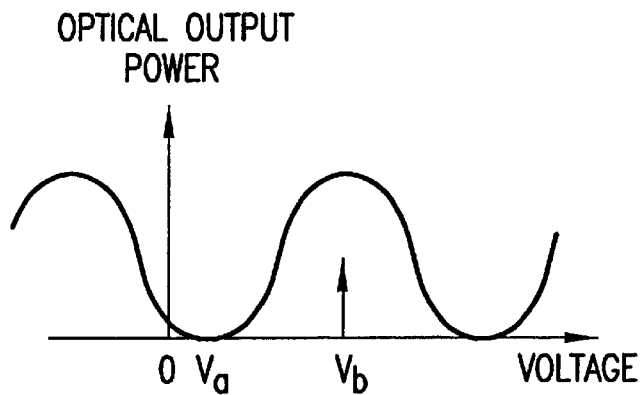
FIG. 2 shows a known modulation switching curve for the modulator shown in FIG. 1.

FIG. 2 shows a typical modulation switching curve for the modulator shown in FIG. 1. Normalized optical output power is shown on the ordinate and voltage is shown on the abscissa. The electrode pair or pairs is normally biased so that a pulse in the electrical domain is translated into a pulse in the optical domain. That is, an electrical bit of "1" (represented by maximum voltage) is translated into an optical bit of "1" (represented by maximum optical output power). Likewise, an electrical bit of "0" (represented by minimum voltage) is translated into an optical bit of "0" (represented by minimum optical output power). As FIG. 2 shows, an optical bit of "1" will yield an optical bit of "0" when the voltage changes by one-quarter of a complete voltage cycle (i.e., from $V_a$ to $V_b$ in FIG. 2). As a consequence, only a quarter of the voltage cycle is employed to generate the optical bits.

In accordance with the present invention, the lithium niobate amplitude modulator is biased in such a way that a change in voltage level (from "1" to "0" or visa versa) is translated into an optical bit of "1" and a constant voltage level is translated into an optical bit of "0." This is accomplished by initially biasing the modulator at a voltage that produces a maximum optical power output. In other words, the voltage bias is initially placed at a value that would translate into an optical "1" in the known arrangement shown in FIG. 2.

Figures 3A, 3B:
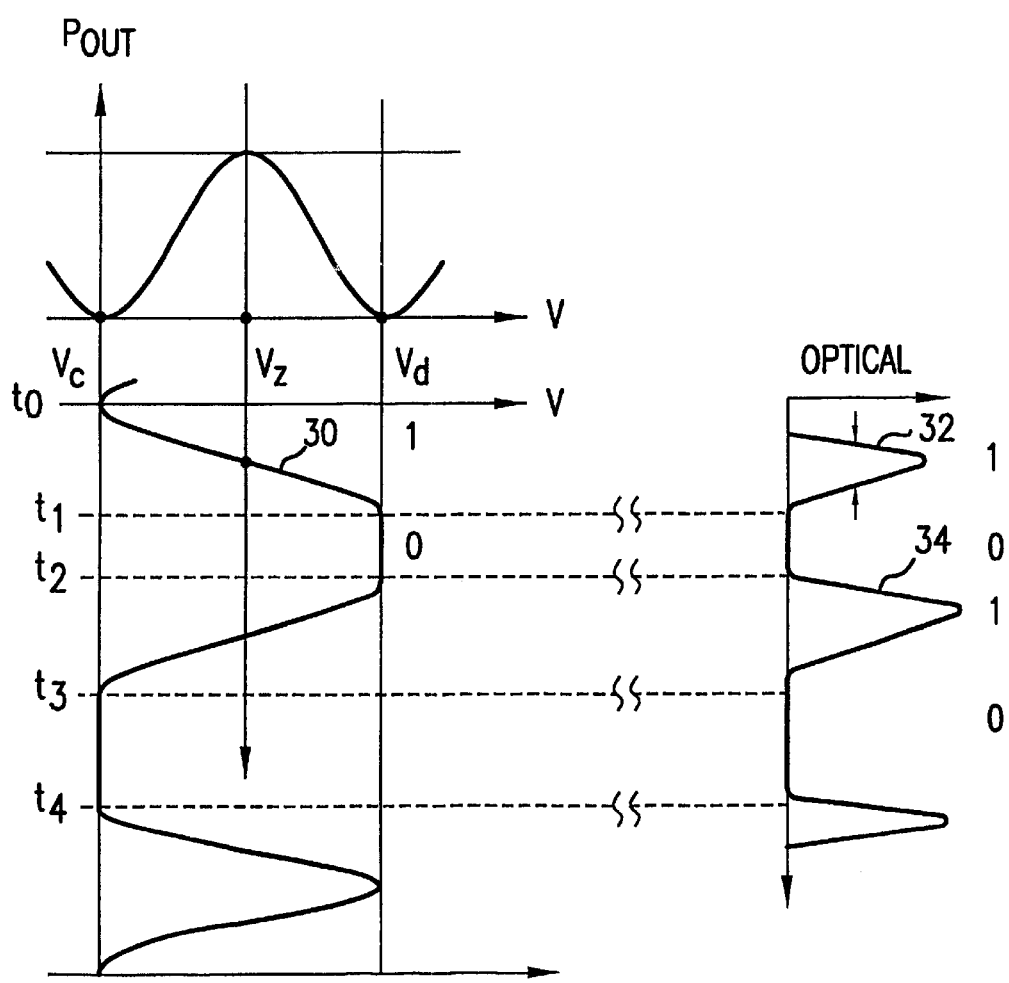
FIG. 3(a) shows a modulation switching curve in accordance with the present invention and FIG. 3(b) shows a complete voltage cycle applied to the modulator and the resulting optical signal levels corresponding thereto.

FIG. 3(a) shows a modulation switching curve in accordance with the present invention in which the modulator is initially biased at $V_1$, which is intermediate to voltages $V_c$ and $V_d$ defining the lower and upper limits of the voltage applied to the modulator. FIG. 3(b) shows a complete cycle of the voltage (curve 30) as it is applied to the modulator (left-most side of FIG. 3(b)) and the corresponding optical signal levels that are produced (right-most side of FIG. 3(b)). In FIG. 3(b) time is indicated on the ordinate. As the applied voltage is changed from $V_c$ to $V_d$ along curve 30 during the time interval between $t_0$ and $t_1$, the optical output power changes in accordance with the modulation switching curve shown in FIG. 3(a). That is, the change in voltage from $V_c$ to $V_d$ is translated into optical pulse 32 shown on the rightmost portion of FIG. 3(b). Pulse 32 corresponds to an optical bit of "1."

Next, the voltage remains constant at $V_d$ for a prescribed time interval between $t_1$ and $t_2$, producing an optical bit of "0." During the time interval between $t_2$ and $t_3$ the voltages changes from $V_d$ to $V_c$, yielding a second optical pulse 34. Once again, the voltage remains constant (at the level $V_c$) for the time interval between $t_3$ and $t_4$, producing an optical bit of "0."

FIG. 3(b) shows that over the course of a complete voltage cycle, which occurs between time $t_0$ and $t_4$, two optical pulses or bits are produced. In contrast, known biasing arrangements such as discussed in connection with FIG. 2 generate one pulse over a quarter of a voltage cycle. The present invention thus allows more refined control over the generation of optical bits. Another advantage of the inventive biasing arrangement is that a change in voltage level (i.e., the edge of the voltage pulse defined between times $t_0$ and $t_1$ in FIG. 3(b)) produces an optical pulse, whereas in the prior arrangement an electrical pulse was required to produce an optical pulse. This is advantageous because it is easier to produce a sharp voltage transition than it is to produce a narrow electrical pulse. The present invention is therefore capable of producing extremely narrow optical pulses, thus facilitating the generation of solitons, which require such narrow optical pulses.

What is claimed is:

1. A method for generating temporally narrow optical pulses with an electro-optic amplitude modulator having a pair of waveguides and a first pair of electrodes for controlling a refractive index of at least one of the waveguides, said method comprising:

(a) biasing the modulator at a voltage that produces a maximum optical power output;

(b) receiving a cw optical signal at an input waveguide of the modulator;

(c) applying a first electrical pulse to the electrode pair to modulate the cw optical signal so that an edge of said first electrical pulse yields an optical pulse at an output waveguide of the modulator; and (d) providing a second electrical pulse to a second electrode pair and applying said second electrical pulse to said second electrode pair to modulate the cw optical signal so that an edge of said first electrical pulse yields an optical pulse at an output waveguide of the modulator, wherein said first electrical pulse and said second electrical pulse are 180 degrees out of phase with respect to one another.

2. The method of claim 1 wherein said optical pulse has a temporal width substantially equal to the temporal width of the edge.

3. The method of claim 1 wherein said modulator is a lithium niobate modulator.

4. The method of claim 1 wherein said optical pulse corresponds to an optical bit of one, and further comprising the stop of maintaining a constant voltage level between said first electrode pair to generate an optical bit of zero.

5. The method of claim 1 wherein said optical pulse corresponds to an optical bit of zero, and further comprising the step of maintaining a constant voltage level between said first electrode pair to generate an optical bit of one.

6. The method of claim 1 wherein the step of applying a first electrical pulse includes the step of applying a complete voltage cycle to generate two optical pulses at the output waveguide of the modulator.

7. The method of claim 1 wherein said optical pulse is a soliton.

8. A method for generating temporally narrow optical pulses with an electro-optic amplitude modulator having a pair of waveguides and at least one pair of electrodes for controlling a refractive index of at least one of the waveguides, said method comprising:

(a) biasing the modulator at a voltage that produces a maximum optical power output;

(b) receiving a cw optical signal at an input waveguide of the modulator;

(c) changing a voltage level applied to the electrode pair to modulate the cw optical signal so that an optical pulse at an output waveguide of the modulator is generated; and, (d) wherein said optical pulse corresponds to an optical bit of one, and further comprising the step of maintaining a constant voltage level between the electrode pair to generate an optical bit of zero.

9. The method of claim 8 wherein said optical pulse has a temporal width substantially equal to the time over which said voltage level is changed.

10. The method of claim 8 wherein said modulator is a lithium niobate modulator.

11. The method of claim 1 wherein the step of changing the applied voltage level includes the step of applying a complete voltage cycle to generate two optical pulses at the output waveguide of the modulator.

12. The method of claim 8 wherein said optical pulse is a soliton.

13. An electro-optic amplitude modulator, comprising:

first and second waveguides forming an optical interferometer, at least said first waveguide including an electro-optic material;

a first electrode extending along a portion of said first waveguide;

a second electrode extending along a portion of said second waveguide;

an input and output optical waveguide respectively coupled to input and output junctions of the interferometer;

a voltage source for biasing said first and second electrodes such that a modulation switching curve arises that generates two optical pulses over a complete voltage cycle.

14. The modulator of claim 13 wherein said electro-optic material is lithium niobate.

15. The modulator of claim 13 wherein said voltage source generates an electrical waveform that is sinusoidal.

16. The modulator of claim 13 wherein said voltage source biases said first and second electrodes 180 degrees out of phase with respect to one another.

17. The modulator of claim 13 wherein said optical pulses have a temporal width substantially equal to the time over which voltage applied to said first and second electrodes by said voltage source changes from a first to a second value.

18. The modulator of claim 17 wherein said first and second values are minimum and maximum voltage levels, respectively.

19. The modulator of claim 13 wherein said optical pulses are solitons.

20. A method for generating temporally narrow optical pulses with an electro-optic amplitude modulator having a pair of waveguides and at least one pair of electrodes for controlling a refractive index of at least one of the waveguides, said method comprising:

(a) biasing the modulator at a voltage that produces a maximum optical power output;

(b) receiving a cw optical signal at an input waveguide of the modulator;

(c) changing a voltage level applied to the electrode pair to modulate the cw optical signal so that an optical pulse at an output waveguide of the modulator is generated; and (d) wherein said optical pulse corresponds to an optical bit of zero, and further comprising the step of maintaining a constant voltage level between the electrode pair to generate an optical bit of one.

* * * * *